(12) United States Patent
Maleki Tehrani et al.

(10) Patent No.: US 12,358,612 B2
(45) Date of Patent: Jul. 15, 2025

(54) SYSTEM AND METHOD OF A FLYING SYSTEM

(71) Applicants: Leland Danesh Maleki Tehrani, Atherton, CA (US); Ardavan Maleki Tehrani, Atherton, CA (US)

(72) Inventors: Leland Danesh Maleki Tehrani, Atherton, CA (US); Ardavan Maleki Tehrani, Atherton, CA (US)

( * ) Notice: Subject to any disclaimer, the term of this patent is extended or adjusted under 35 U.S.C. 154(b) by 130 days.

(21) Appl. No.: 18/173,099

(22) Filed: Feb. 23, 2023

(65) Prior Publication Data
US 2024/0199199 A1 Jun. 20, 2024

Related U.S. Application Data

(60) Provisional application No. 63/314,305, filed on Feb. 25, 2022.

(51) Int. Cl.
*G06F 17/00* (2019.01)
*B64C 19/00* (2006.01)
*B64C 39/02* (2023.01)

(52) U.S. Cl.
CPC ............ *B64C 19/00* (2013.01); *B64C 39/026* (2013.01)

(58) Field of Classification Search
CPC ....... B64C 19/00; B64C 39/026; B64D 31/10; B64D 31/16

USPC .............................................. 701/3
See application file for complete search history.

(56) References Cited

U.S. PATENT DOCUMENTS

| | | | | |
|---|---|---|---|---|
| 11,565,809 | B2 * | 1/2023 | Mehta ................. | G05D 1/0072 |
| 11,597,511 | B2 * | 3/2023 | Moore ............... | B64C 29/0033 |
| 11,939,051 | B2 * | 3/2024 | Moore .................. | G05D 1/652 |
| 2024/0124134 | A1 * | 4/2024 | German ................ | B64U 50/19 |
| 2024/0190561 | A1 * | 6/2024 | Norouzi ................ | B64U 10/16 |
| 2024/0199199 | A1 * | 6/2024 | Maleki Tehrani .... | B64C 39/026 |

OTHER PUBLICATIONS

Case study: Analysis of the response of an aircraft structure (Year: 2013).*

* cited by examiner

*Primary Examiner* — Ronnie M Mancho

(57) ABSTRACT

The present disclosure concerns a flight system comprising: a controller, a group of one or more propellers coupled to the controller; wherein the controller comprises of one or more sensors; and wherein the controller is configured to: capture data from the one or more sensors; perform an analysis on the data; wherein the analysis is configured to indicate a failure of a propeller; adjust the speed of one or more propellers coupled to the controller based on the analysis indicating the failure of the propeller.

17 Claims, 11 Drawing Sheets

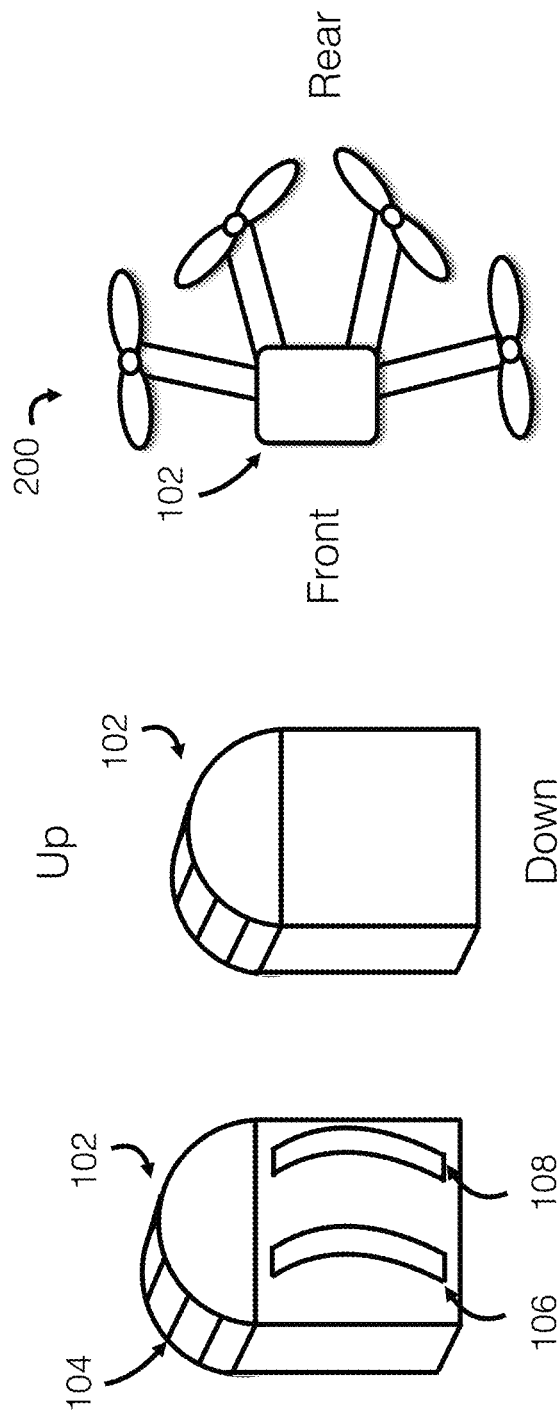
FIG. 2a) Front view  FIG. 2b) Rear view  FIG. 2c) Top view

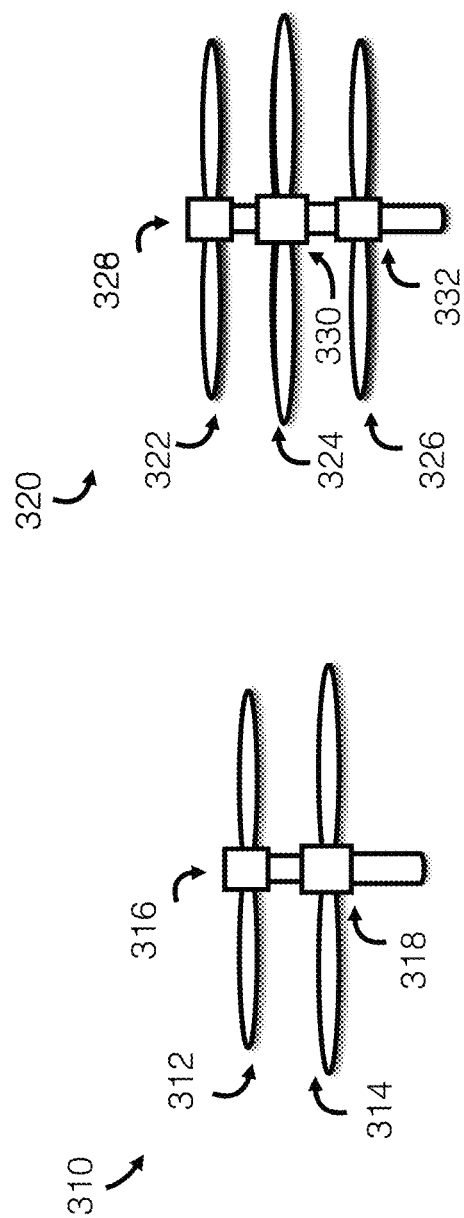

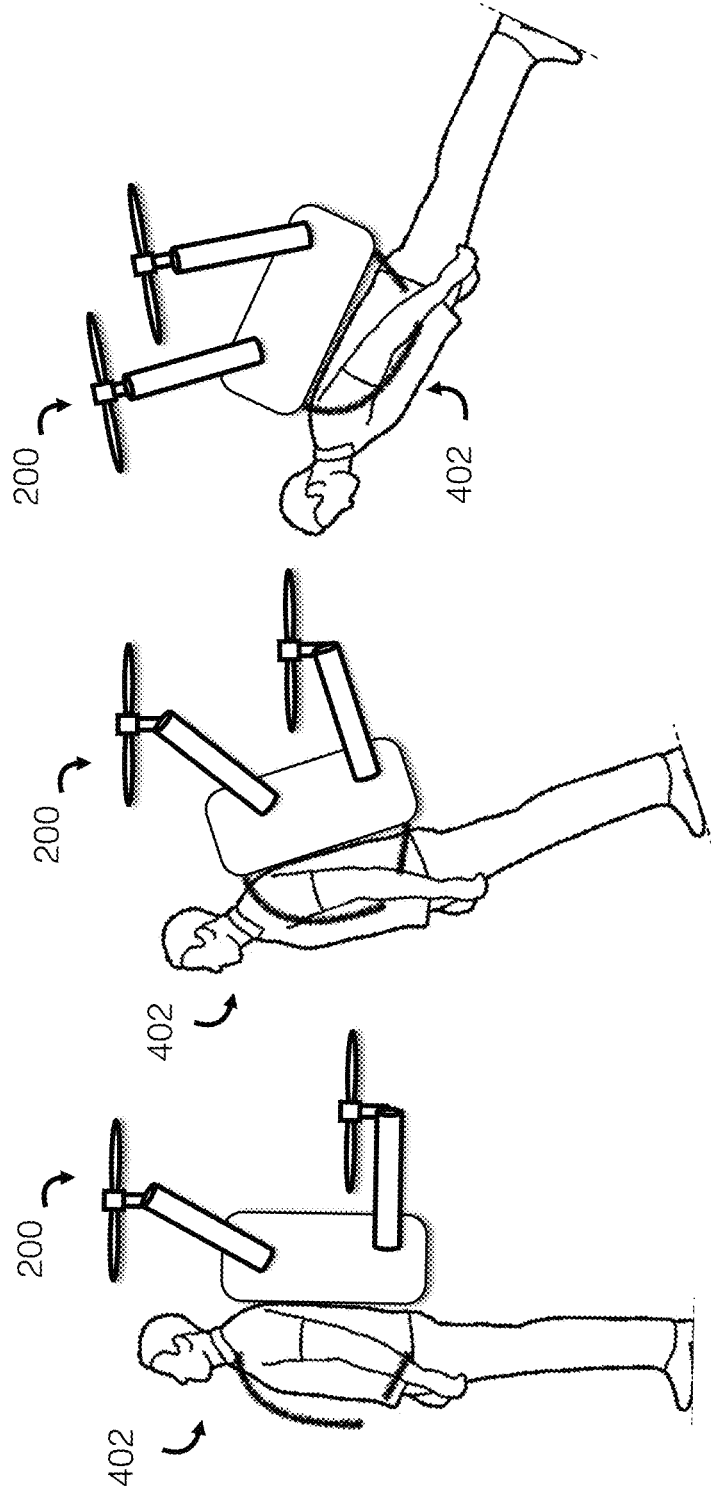
FIG. 4a) Upright position    FIG. 4b) Forward tilt    FIG. 4c) Semi Horizontal

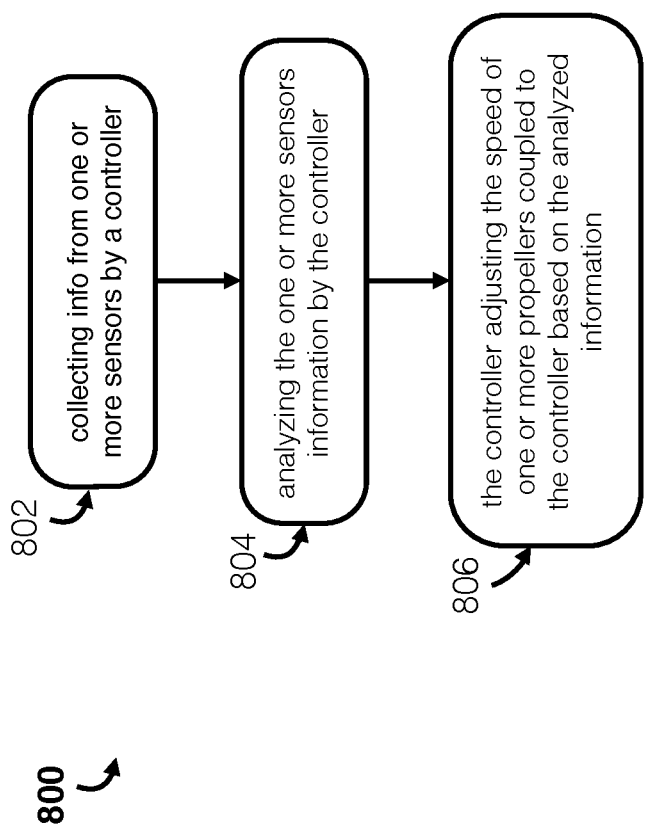

SYSTEM AND METHOD OF A FLYING SYSTEM

CROSS-REFERENCE TO RELATED APPLICATIONS

This application claims the benefit of Provisional Patent Application No. 63/314,305, filed Feb. 25, 2022, which is incorporated herein by reference.

BACKGROUND

Technical Field

The following disclosure relates generally to systems and methods associated with a flying system.

Description of the Related Art

Most non-manned small flying vehicles are comprised of drones, which mostly are battery operated. On the other hand, manned flying vehicles, which could carry humans are mostly large in size, and typically operate using some sort of combustion engine or small rocket engines. Traditionally, the smallest manned flying vehicles have been some kind of helicopter. There have been attempts to create small manned flying systems, in particular the Jetman is one, which uses a wing with small jet/rocket engines to help a human fly. These systems, at times are very difficult to operate, require extensive training, and also pose serious dangers if not operated properly or if suffering from a system related failure or damage.

BRIEF SUMMARY

In an embodiment, a non-transitory machine-readable medium comprises instructions that, when executed by a controller of a flight system, cause the controller to: capture data from one or more sensors; perform an analysis on the data; wherein the analysis is configured to indicate a failure of a propeller; adjust the speed of one or more propellers coupled to the controller based on the analysis indicating the failure of the propeller; wherein the speed of the one or more propellers is adjusted by increasing the speed of a propeller rotating in the opposite direction of the failed propeller up to a first speed threshold, and increasing the speed of another propeller rotating in the same direction of the failed propeller up to a second speed threshold, wherein the second speed threshold is larger than the first speed threshold.

In an embodiment, the first threshold and the second threshold are selected such that the combined angular momentum generated by all operating propellers has a sum of zero. In an embodiment the controller is coupled to the propellers via one or more electric connections, and wherein the controller sends signals via the one or more electric connections to control the speed of the propellers. In an embodiment, increasing the speed of the propeller rotating in the opposite direction of the failed propeller comprises increasing a voltage input to an electric motor rotating the propeller, and wherein the increasing the speed of the other propeller rotating in the same direction of the failed propeller comprises increasing a voltage input to an electric motor rotating the other propeller.

In an embodiment, the analysis indicates a failure of a propeller by: detecting a change in a spatial position of the flight system including one or more of: spinning, a loss of altitude, and a change in orientation; detecting a change exceeding a threshold in an electric current of the failed propeller electric motor; or a combination thereof. In an embodiment, an arm associated with an operating propeller is moved to bring the center of lift of the flight system to a desired position relative to the center of gravity of the flight system.

In an embodiment, a non-transitory machine-readable medium comprises instructions that, when executed by a controller of a flight system, cause the controller to: capture data from one or more sensors; perform an analysis on the data, wherein the analysis is configured to indicate a failure of a propeller; adjust the speed of one or more propellers coupled to the controller based on the analysis indicating the failure of the propeller; wherein the speed of the one or more propellers is adjusted by increasing the speed of propellers rotating in the same direction of the failed propeller until the data captured by one or more sensors indicates that a flight orientation of the flight system has returned to an original flight orientation existent prior to the failure of the propeller.

In an embodiment, the speed of the one or more propellers is adjusted by increasing the speed of the one or more propellers such that the combined angular momentum generated by all operating propellers has a sum of zero. In an embodiment, the analysis is configured to indicate a change in flight orientation of the flight system from the original flight orientation; and wherein the speed of the one or more propellers is adjusted by increasing the speed of a propeller and decreasing the speed of another propeller, until the data captured by the one or more sensors indicates that the flight orientation has returned to the original flight orientation.

In an embodiment, the analysis is configured to indicate a change in flight orientation of a flight system from the original flight orientation; and wherein the speed of the one or more propellers is adjusted by increasing the speed of a propeller and decreasing the speed of another propeller, such that the combined angular momentum generated by all operating propellers has a sum of zero. In an embodiment, the speed of the one or more propellers is adjusted by decreasing the speed of a propeller rotating in the opposite direction of the failed propeller. In an embodiment, the controller is coupled to the one or more propellers via one or more electric connections, and wherein the controller sends signals via the one or more electric connections to control the speed of the one or more propellers.

In an embodiment, increasing the speed of the propeller comprises increasing a voltage input to an electric motor rotating the propeller, and decreasing the speed of the other propeller comprises decreasing the voltage input to the electric motor rotating the other propeller. In an embodiment, the analysis indicates the failure of the propeller by: detecting a change in a spatial position of the flight system including one or more of: spinning, a loss of altitude, and a change in the orientation; detecting a change exceeding a threshold in an electric current of the failed propeller electric motor; or a combination thereof. In an embodiment, an arm associated with an operating propeller is moved to bring the center of lift of the flight system to a desired position relative to the center of gravity of the flight system.

In an embodiment, a flight system comprises: a controller, a first group of one or more propellers coupled to the controller operating in a first direction, a second group of one or more propellers coupled to the controller operating in a second direction, wherein the second direction is the opposite of the first direction; wherein the controller comprises of one or more sensors; and wherein the controller is configured to: capture data from one or more sensors; perform an analysis on the data; wherein the analysis is configured to indicate a failure of a propeller; adjust the speed of one or more propellers coupled to the controller based on the analysis indicating a the failure of a the propeller; wherein the speed of the one or more propellers is adjusted by increasing the speed of a propeller rotating in the opposite direction of the failed propeller up to a first speed threshold, and increasing the speed of another propeller rotating in the same direction of the failed propeller up to a second speed threshold, wherein the second speed threshold is larger than the first speed threshold. In an embodiment, the first threshold and the second threshold are selected such that the combined angular momentum generated by all operating propellers has a sum of zero.

This Brief Summary is provided to introduce certain concepts in a simplified form that are further described in detail in the Detailed Description. Except where otherwise expressly stated, the Brief Summary does not identify key or essential features of the claimed subject matter, nor is it intended to limit the scope of the claimed subject matter.

BRIEF DESCRIPTION OF THE DRAWINGS

FIG. 2a is a front perspective view of an embodiment of a frame of a flying system.

FIG. 2b is a rear perspective view of the frame of FIG. 2a.

FIG. 2c is a top view of the frame of FIG. 2a showing propellers.

FIGS. 3a and 3b are side views of embodiments of propeller configurations.

FIG. 4a is a side view of an embodiment of a flying system with pilot in an upright orientation.

FIG. 4b is a side view of an embodiment of a flying system with pilot in a forward tilt orientation.

FIG. 4c is a side view of an embodiment of a flying system with pilot in a semi-horizontal orientation.

FIG. 8 is a flowchart of a method for controlling propeller speed in a flying system.

DETAILED DESCRIPTION

Figure 1:
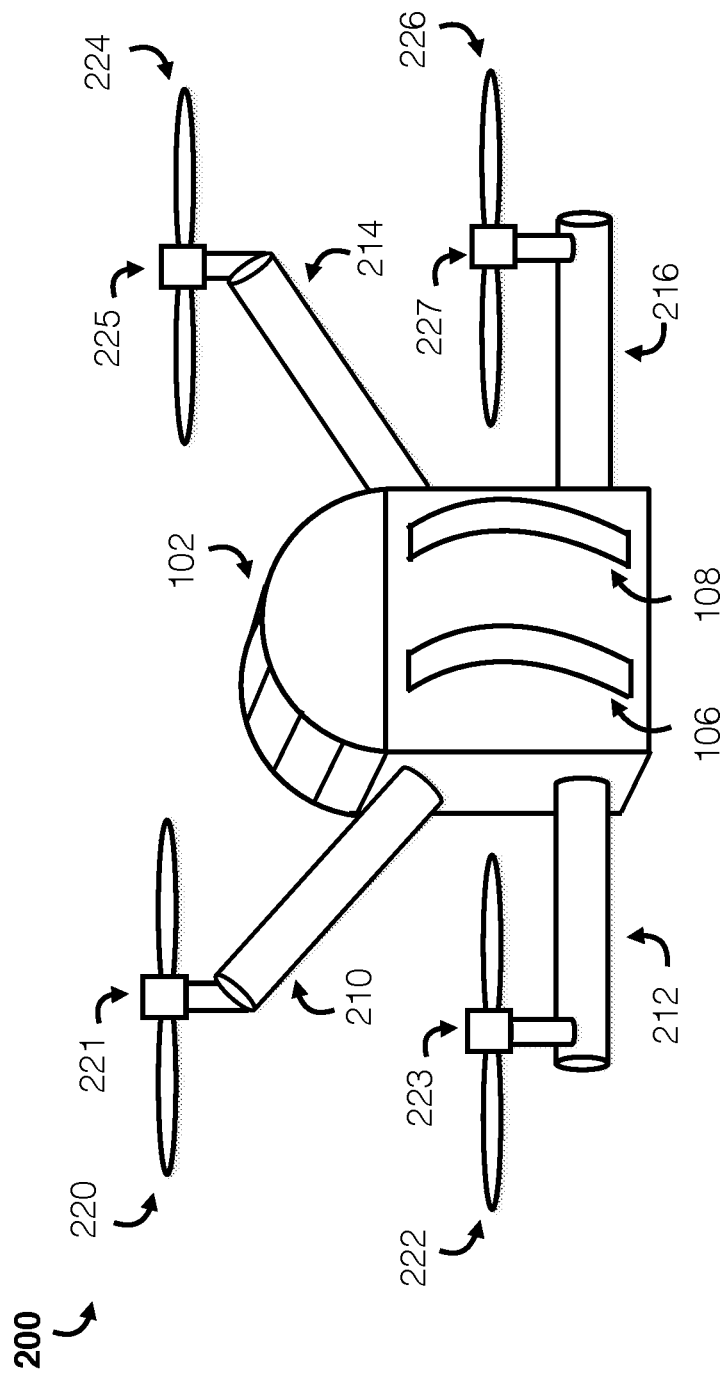
FIG. 1 is a perspective diagram of an embodiment of a flying system.

There is a need and interest in a small flying vehicle and/or system, which would be easy to operate, would be small in size, and most importantly would be safe to operate, especially with respect to possible certain system failures. Embodiments of the present invention relate to a secure flying system, that in preferred embodiments can fit in a backpack, and could be carried by a human being on their back.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, control circuits, accelerometers, gyroscopes, electric motors, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment", or "some embodiments", means that a particular feature, structure or characteristic described in connection with the embodiment(s) is included in at least one embodiment. Thus, the appearances of the phrases "in one embodiment," or "in an embodiment", or "some embodiments", in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

FIG. 1 illustrates a block diagram of an embodiment of a flying system 200. The flying system 200 comprises a frame 102; two or more propellers 220, 222, 224, and 226; and two or more propeller arms 210, 212, 214 and 216 that attach the propellers 220, 222, 224, and 226 to the frame 102. Each propeller may have two or more blades. Each propeller 220, 222, 224, and 226 may be attached to a respective motor 221, 223, 225 and 227 that is attached to a respective arm 210, 212, 214 and 216. Motors 221, 223, 225 and 227 are powered to operate the propellers 220, 222, 224, and 226. An arm 210, 212, 214 and 216 may be rotatable to change a position and/or orientation of the respective propeller 220, 222, 224, and 226. In a preferred embodiment, the motors are electric. The arms 210, 212, 214 and 216 may be retractable into and out of the backpack 102. The arms may be retracted manually or automatically. The automatic retraction may be done by an actuator and/or an electric motor. The frame 102 may be configured as a backpack, with straps 106 and 108 to hold the backpack on the back of a person.

FIGS. 2a, 2b, and 2c illustrate various views of a frame 102 for a flying system. The frame may be shaped and sized as a backpack 102 having straps 106 and 108 to be utilized to hold the backpack on the back of a person. A strap 106 and 108 may be vertically aligned (as shown), horizontally aligned, angled, or positioned and oriented in any suitable way to safely secure a person carrying the backpack. The frame 102 may have any suitable shape, such as the depicted rectangular bottom portion with semicircular top portion. Solar panels 104 may be positioned at the top of the frame 102. The solar panels 104 generate electricity for charging a battery and/or providing electric power to other components of the flying system 200. The frame 102 may be made of one or more of the following materials: leather, plastic, nylon, metal, or any other similar material, or a combination thereof.

FIGS. 3a and 3b illustrate different configurations of propellers that may be used with a flying system 200. Propellers are configured to be stacked, with stacked propellers sharing the same main shaft and rotating around the same axis. The propellers may be configured as two or more stacked propellers. Any two of the stacked propellers may be configured to rotate in the same direction. Alternatively or additionally, any two of the propellers may be configured to rotate in opposite directions. Two or more stacked propellers may have the same size blades. Alternatively or additionally, two or more stacked propellers may have different size blades. In some embodiments each stacked propeller has its own motor. All stacked propellers may share the same motor and the same rotation and/or contra rotation of the propellers may be enabled by a suitable transmission. In a preferred embodiment, the motors may be electric.

FIG. 3a illustrates a propeller subsystem 310 of dual-stacked propellers 312 and 314. The stacked propellers have a common main shaft and rotate around the same axis. The first propeller 312 may have the same size blades or different size blades as the second propeller 314. The propellers may rotate in the same direction or in opposite directions. The first propeller 312 has its own motor 316 and the second propeller 314 has its own motor 318. In other embodiments, the propellers 312, 314 may be driven by the same electric motor. In a preferred embodiment, the motors may be electric.

FIG. 3b illustrates a propeller subsystem 332 of tri-stacked propellers 322, 324 and 326. The stacked propellers have a common main shaft and rotate around the same axis. The stacked propellers 322, 324 and/or 326 may rotate in same direction or in opposition directions. Two or more stacked propellers 322, 324 and/or 326 may have same size blades. Two or more stacked propellers 322, 324 and/or 326 may have different size blades. The first propeller 312 has its own electric motor 328, the second propeller 324 has its own electric 330, and the third propeller 326 has its own electric 332. In other embodiments, the propellers 322, 324 and/or 326 may be driven by a common electric motor. In a preferred embodiment, the motors may be electric.

FIGS. 4a, 4b, and 4c illustrate example flight orientations of a flying system 200 when carrying a load, such as a human 402. FIG. 4a shows an upright position. FIG. 4b shows an orientation with forward tilt. FIG. 4c shows a semi-horizontal orientation. The different orientations would cause challenges for a typical traditional drone. The center of gravity of the whole flying system moves as orientation of the person 402 or other load changes.

In embodiments of the present invention, the flying system 200 adjusts flight controls to compensate for such changes in orientation to support a stable and safe flight. The adjustments include one or more of: aligning and changing the orientation for the propellers, aligning and changing the orientation for the propeller arms, and/or aligning and changing the orientation for the propellers speed, or a combination thereof.

Figures 5A, 5B, 5C:
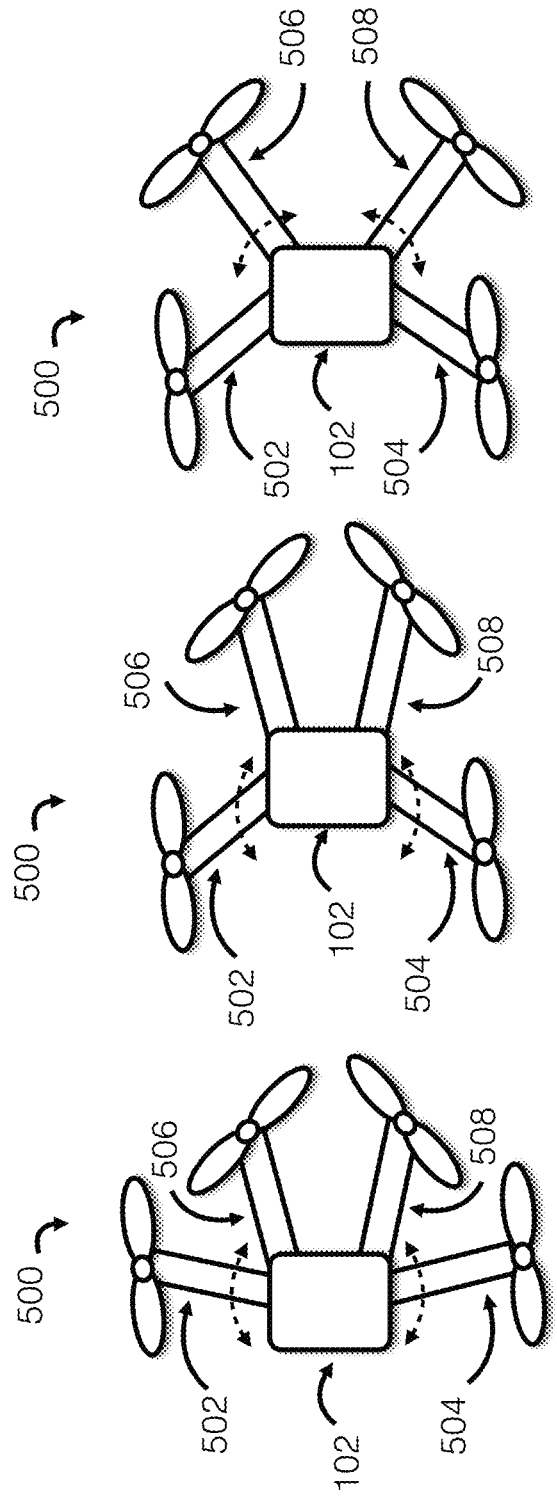
FIGS. 5a, 5b, and 5c are top views of an embodiment of a flying system showing different propeller arm movements.

FIGS. 5a, 5b, and 5c illustrate various propeller arm movements of a flying system 500. The flying system 500 corresponds to the flying system 200 with arms with the ability to move. Propeller arm movement may assist with maintaining stable flight, for example, when the center of gravity of the flying system 500 shifts. In some embodiments, a shift in the center of gravity may happen when the lift force from one or more of the propellers changes, such as loss of lift from one of the propellers. In the flying system 500, propeller arms 502, 504, 506, and 508 may rotate back (rear) and forward (front) and/or up and down with respect to the frame 102. The arms 502 and 504 corresponds to arms 210 and 214 in flying system 200, and the arms 506 and 508 corresponds to arms 212 and 216 in flying system 200. The FIG. 5a shows an example configuration with arms 502 and 504 positioned on the two sides of the flying system 500 and arms 506 and 508 positioned towards the rear of the flying system 500. FIG. 5b shows a configuration with arms 502 and 504 moved towards the front of the two sides of the flying system 500 and arms 506 and 508 kept at the same position as in FIG. 5a. FIG. 5c shows a configuration with arms 506 and 508 moved away from each other and towards the sides of flying system 500. The arms 502 and 504 are kept at the same positions as in FIG. 5b. The arm movements may be controlled by using electric motors or actuators.

Figure 6B:
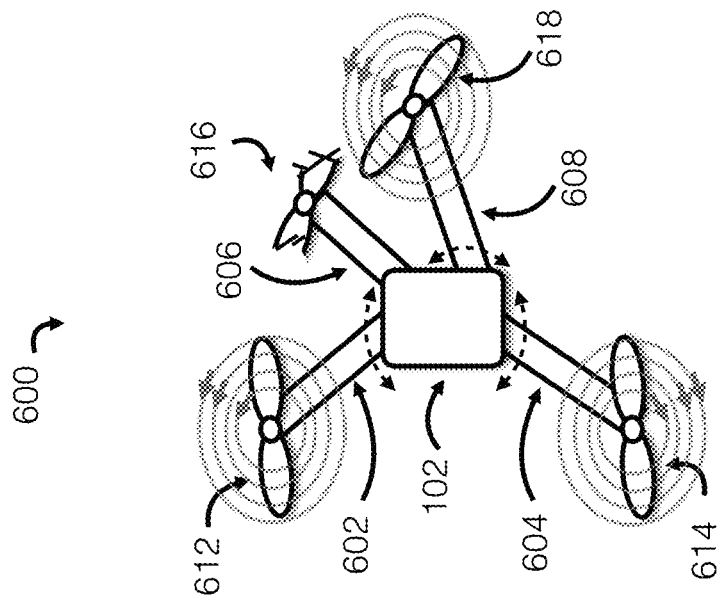
FIGS. 6a and 6b are top views of an embodiment of a flying system showing different propeller arm movements when one of the propellers has failed.
Figure 6A:
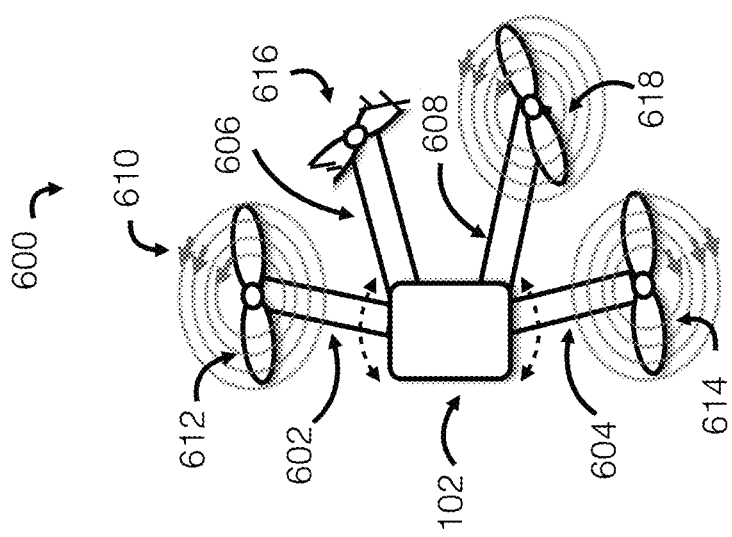

FIG. 6 illustrates example arm movements of a flying system 600 when one of the propellers has failed. The flying system 600 corresponds to the flying system 500 and flying system 200. For example, in case of an accident, a propeller or its blades (for example propeller 616) could break and the associated arm could lose lift provided by the propeller. The motor associated with the propeller 616 may fail or break down, and the propeller 616 would stop spinning, and hence any lift force generated by the propeller 616 may be lost. A propeller failure may be caused by an object such as a flying bird hitting the propeller. No matter what causes a propeller to fail, such failure could be extremely dangerous for the passenger or operator 402 (see FIG. 4) of the flying system 200. Embodiments of the present invention provide solutions to stabilize the flight, and hence, protect the passenger or operator 402 and/or the flying system 200. In the example shown in FIG. 6a, a flying system 600 comprises propellers 612, 614 and 618 in operation, supported by arms 602, 604 and 608 respectively. The arms 602 and 604 correspond to arms 502 and 504 of flying system 500, and the arms 606 and 608 correspond to arms 506 and 508.

The arrows 610 show example directions of spinning for propellers 612, 614 and 618. In this example, the propellers 612 and 618 rotate in the same direction, and propellers 614 rotates in the opposite direction with respect to propellers 612 and 618. The propeller 616 supported by arm 606 is broken and is not spinning. In this example, the propeller 616, before failing, may have rotated in the same direction as propeller 614. The loss of lift force caused by a broken propeller 616 causes an imbalance of lift forces on the two side of the flying system 200. It also causes an imbalance in angular momentum, since two propellers 612 and 618 rotate in one direction and only one propeller 614 rotates in the opposite direction. As a result, the flying system may start rotating in the same direction as propellers 612 and 618 because propellers 612 and 618 combined have a larger angular momentum than propeller 614.

In physics, angular momentum (sometimes called moment of momentum or rotational momentum) is the rotational analog of linear momentum. It is an important physical quantity because it is a conserved quantity-the total angular momentum of a closed system, such a flying system, remains constant. Angular momentum has both a direction and a magnitude, and both are conserved. Angular momentum is proportional to moment of inertia, and angular speed. Moment of inertia is similar to mass. However, moment of inertia also depends on the position of the axis of rotation and the shape of the matter. In a simple form, moment of inertial is proportional to mass, and a distance of the mass from a center of rotation, which depends on the physical configurations such as size, shape and form of the spinning object. The angular speed, is proportional to the rotational speed. In operation of a flying system, such as system 200, the contribution of each propeller to the total angular momentum is proportional to the propeller's speed, since the physical configuration (relevant location, form, size, mass) are fixed and constant. Therefore, by controlling the propeller speed, the contribution to the total angular momentum may be controlled. As used in this specification and the appended claims, the term speed and propeller speed refer to the rotational speed of a propeller, which is also proportional to its angular speed. For instance, propeller speeds are measured in Rotations/Revolutions Per Minute (RPM), for example a propeller with a speed of 1000 RPM.

In some embodiments, the propeller 614, which is rotating in the same direction as the failed propeller 616 is configured to rotate faster, so that the combined angular momentum generated by all propellers has a sum of zero, and the flying system stops to rotate. In some embodiments, the propeller 612 and 618 are configured to rotate slower so that the combined (total) angular momentum generated by all propellers has a sum of zero and the flying system stops to rotate/spin.

The objective of stopping the spinning of the flying system which is equivalent to bringing the total angular momentum to zero, may be accomplished by controlling the speed of the propellers. The speed of the propellers may be adjusted with reference to their existing or last speed, when the flying system is not spinning and therefore has a total angular momentum of zero. This may be done by considering that each propeller's speed has a linear contribution to the total angular momentum. For example, when the total angular momentum is zero, if all propeller speeds are doubled, the total angular momentum remains zero. This is because the contribution to angular momentum from propellers rotating in opposite direction of each other will still be equal and cancel each other.

In some embodiments, the propellers 612 and 618 are configured to rotate slower up to a first speed threshold, and propeller 614 is configured to rotate faster up to a second speed threshold, wherein the second speed threshold is larger than the first speed threshold, so that the combined (total) angular momentum generated by all propellers have a sum of zero, and the flying system stops to rotate. Furthermore, the increased speeds on the propeller 614 may compensate for the loss of lift due the failed propeller 616. For example, the propeller 614 may be configured to rotate at 50% faster speed while the propellers 612 and 618 may be configured to rotate each at 25% slower speed. As a result of the new adjusted speeds, in each direction, the contribution to angular momentum is reduced to 75%, however the total angular momentum remains zero, and the flying system will stop spinning.

As shown in the example, when one propeller fails, one or more propellers continues to rotate in the opposite direction, and at least one propeller continues to spin the same direction as the failed propeller. In some embodiments, the propellers rotating in the opposite direction of the failed propeller are configured to rotate slower and/or one or more propellers rotating in the same direction of the failed propeller are configured to rotate faster. In some embodiments, the propellers rotating in the opposite direction of the failed propeller are configured to rotate faster up to a first speed threshold and one or more propellers rotating in the same direction of the failed propeller are configured to rotate faster up to a second threshold, wherein the second speed threshold is larger than the first speed threshold, so that the combined (total) angular momentum generated by all propellers have a sum of zero, and the flying system stops to rotate. The increased speeds on the propellers may compensate for the loss of lift due to the failed propeller.

In some example embodiments, the arms 602, 604, 606 and 608 may move to balance the lift if one or more of the propellers 612, 614, 616, and/or 618 fail to operate or break down. FIG. 6b illustrates an example in which the arms 602, 604, 606, and 608 are moved to balance and distribute the lift forces provided by operation of operating propellers 612, 614, and 618. The arms 602 and 604 may be moved forward to the front of the frame 102. The arm 608 may be moved towards the center in the back of the frame 102. The arm 606 may be moved to the side to create space for movement of the arm 608. The result of the arm movements is a more balanced distribution of lift forces. The arms 602, 604, 608 of the operating propellers 612, 614, 618 may be moved to bring the center of lift to a desired position relative to the center of gravity. For example, the arms 602, 604, 608 may be moved to return the center of lift to the location that existed prior to the failure of the propeller 616. The broken or failed propeller may be one of the side propellers 612 or 614. In such an example, the propeller 614 may be the failed propeller, while all other propellers 612, 616 and 618 may be operating properly. In such case, the arm 608 and propeller 618 are moved towards the front and towards the position of arm 604, so that propeller 618 may compensate for the lift force lost by failure of propeller 614. In this example, the propeller 616 is moved to the center to compensate for the lift force of propeller 618, which is moved towards the front. When one or more of propellers fail or stop operating, the other arms are moved until the flight is stabilized. The arms may be moved in such a way that the combined lift forces would move towards the center of gravity of the flying system. In some embodiments, the positions of the arms in case of failure are preset. For example, when a propeller fails to operate, the other arms/propellers are moved to a preset and/or predefined position. In the example of FIGS. 6a and 6b, the propeller 616 fails in the middle of the flight, while propellers 612, 614 and 618 continue to operate. In some embodiments, the arms 602, 604, 606, and 608 are moved to preset positions shown in FIG. 6b. The center of combined lift force provided by the new preset positions of the arms, may thus be positioned close to the center of gravity of the flying system to return the system to stable flight.

Figure 7:
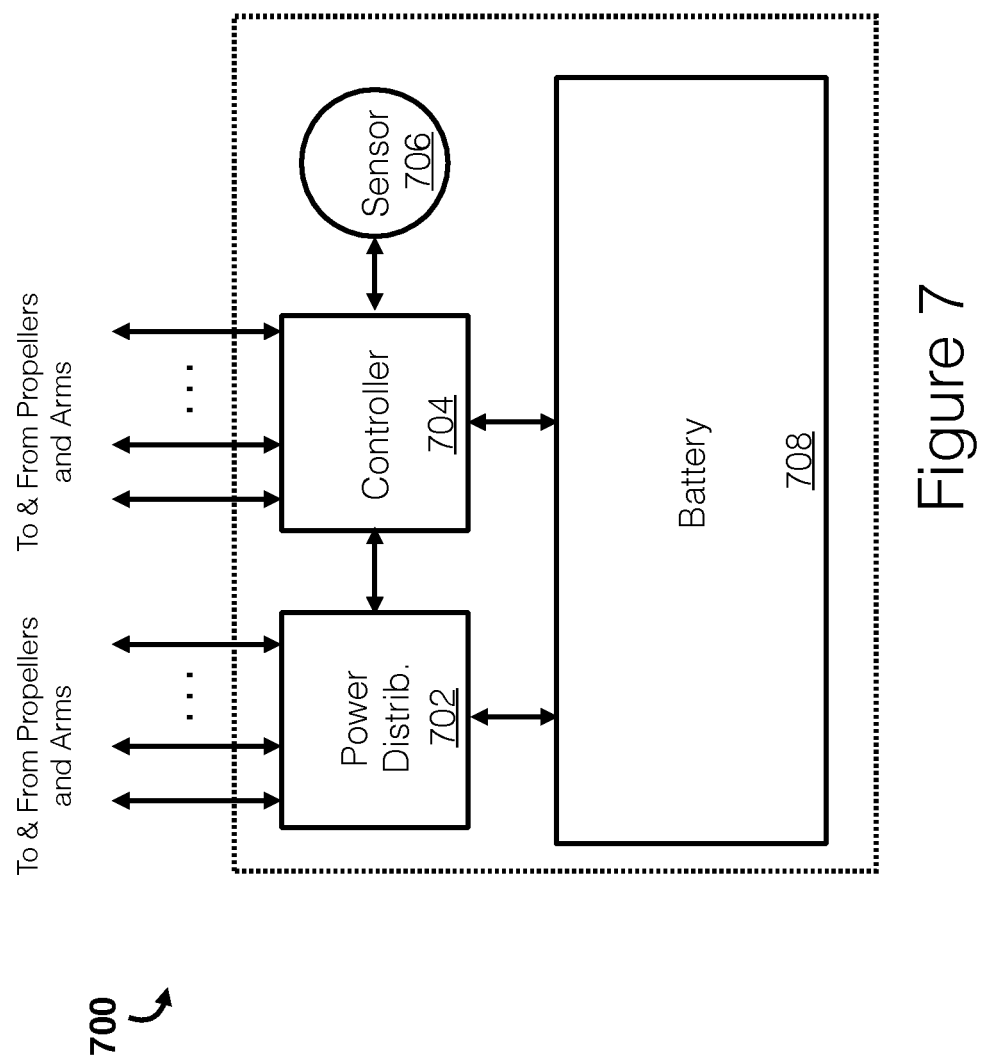
FIG. 7 is a block diagram of an embodiment of a power and control system for a flying system.

FIG. 7 illustrates a power and control system 700 for a flying system, such as the flying system 200 and other flying systems discussed herein. The power and control system 700 700 comprises a power distribution circuit 702, a controller 704, a sensor 706 and a battery 708. The battery 708 is configured to provide electrical power to all components of a flying system 200 that require power. The battery 708 may comprise one more battery cells. The power distribution circuit 702 is configured to distribute electric power to components of the flying system 200 including the propellers (e.g. 220, 222, 224, and 226), and arms (e.g. 210, 212, 214, and 216). The power distribution circuit 702 may be coupled to the battery 708 and controller 704. The power distribution circuit 702 may include power switches, power amplifiers, and fuses to control the flow of electricity to components of the flying system 200. The sensor 706 may be configured to detect and report the spatial orientation of the flying system 200, and may be coupled to the controller 704. For example, the sensor 706 may comprise a gyroscope, accelerometer, an altimeter, a speedometer; a Global Positioning System (GPS) receiver; an inertial measurement unit (IMU), or similar device with similar capabilities. An IMU is an electronic device that measures and reports a moving object's specific force, angular rate, and sometimes the orientation of the object, using a combination of accelerometers, gyroscopes, and sometimes magnetometers. In some embodiments, the sensor 706 measures and monitors the electric current of the electric motors of all the propellers deploying an electric current measurement device such as an Ammeter. In case a propeller fails, the electric motor would draw significantly less current, or no current (if the motor fails). Detecting a significant change or drop of current exceeding a threshold indicates a failure of the propeller.

The Controller 704 is configured to control and configure components of the flying system 200. The controller 704 may be coupled to and configured to control and configure the propellors (e.g. 220, 222, 224, and 226) and the arms (e.g. 210, 212, 214, and 216).

The controller 704 may include a processor, central processing unit (CPU), a microcontroller, a microprocessor, a field-programmable gate array (FPGA), an application-specific integrated circuit (ASIC), or a similar processing device capable of executing instructions. The controller 704 may cooperate with a non-transitory machine-readable medium, which may be a non-volatile memory, that stores instructions. The controller 704 may also cooperate with volatile memory, such as random-access memory (RAM), to execute instructions and store working or temporary data related to the techniques discussed herein.

Instructions may include directly executed instructions, such as a binary sequence or machine code. Instructions may include interpretable code, bytecode, source code, or similar instructions that may undergo additional processing to be executed. All of such examples may be considered processor-executable instructions.

FIG. 8 shows an example method 800 for controlling propeller speed in a flying system. The method 800 may be executed by a controller 704 and may be implemented as instructions stored at a non-transitory machine-readable medium.

At 802, the operations start by collecting data from one or more sensors by a controller coupled to the sensors. At 804, the operations continue by the controller analyzing the data captured by the one or more sensors; and at 806, the operations end by the controller adjusting the speed of one or more propellers coupled to the controller based on analysis of the data captured by the sensor. The method 800 may be repeated continually during flight to compensate for a failed propeller by adjusting arm position and/or adjusting rotational speed of the propellers that remain functional.

Figure 9A:
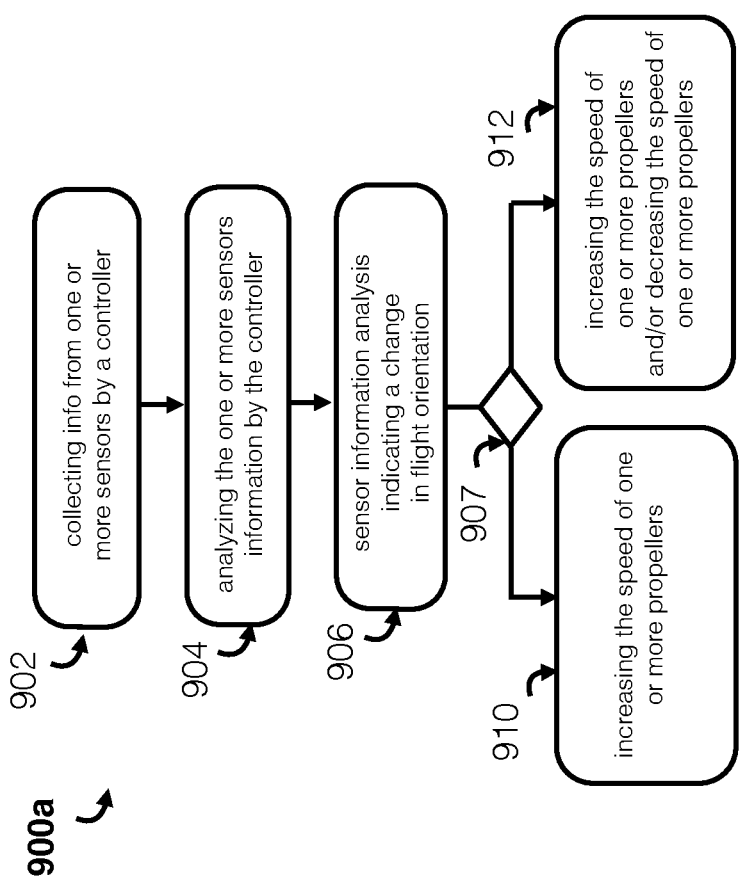
FIG. 9a is a flowchart of a method for controlling propeller speed in a flying system.

FIG. 9*a* shows an example method 900*a* for controlling propeller speed in a flying system. The method 900*a* may be executed by a controller 704 and may be implemented as instructions stored at a non-transitory machine-readable medium.

At 902, the operations start by collecting data from one or more sensors 706 by a controller 704. At 904, the operations continue by the controller analyzing the data captured by the one or more sensors. The one or more sensors comprise at least one of: an accelerometer; a gyroscope; a speedometer; a Global Positioning System (GPS) receiver; an altimeter; an Inertial Measurement Unit (IMU); or a combinations thereof.

Operations continue at 906, when the sensor information analysis indicates a change in flight orientation of the flight system from an original flight orientation. Operations may continue at 910, by adjusting the speed of one or more propellers, wherein adjusting the speed of one or more propellers comprises increasing the speed of one or more propellers until the sensor data indicates the flight orientation has returned to its original flight orientation. Operations may continue at 912, by adjusting the speed of one or more propellers wherein adjusting the speed of one or more propellers comprises increasing the speed of one or more propellers and decreasing the speed of one or more propellers until the sensor data indicates the flight orientation is returned to its original flight orientation. The choice between 910 or 912 is made at 907 and depends on the analysis of the sensor data and the condition of the propellers (i.e. block 906). In some embodiments, when the propellers are operating at the maximum speed, increasing the speed further would not be possible. In such embodiments, stabilizing the orientation will be achieved through decreasing the speed of one or more propellers (i.e. block 912). In some embodiments, in case the propellers are not operating at the maximum speed, the speed of one or more propellers may be increased (i.e. block 910). In some embodiments the speed of one or more propellers may be increased, and the speed of one or more other propellers may be decreased, such that the flight orientation is returned to its original flight orientation. In some embodiments, an arm associated with an operating propeller is moved to bring the center of lift to a desired position relative to the center of gravity of the flying system. In some embodiments, the increase in the speed of one or more propellers and the decrease of the speed of one or more other propellers are executed simultaneously, if computing resources permit. In some embodiments the operations of block 910 and block 912 may be executed consecutively.

Figure 9B:
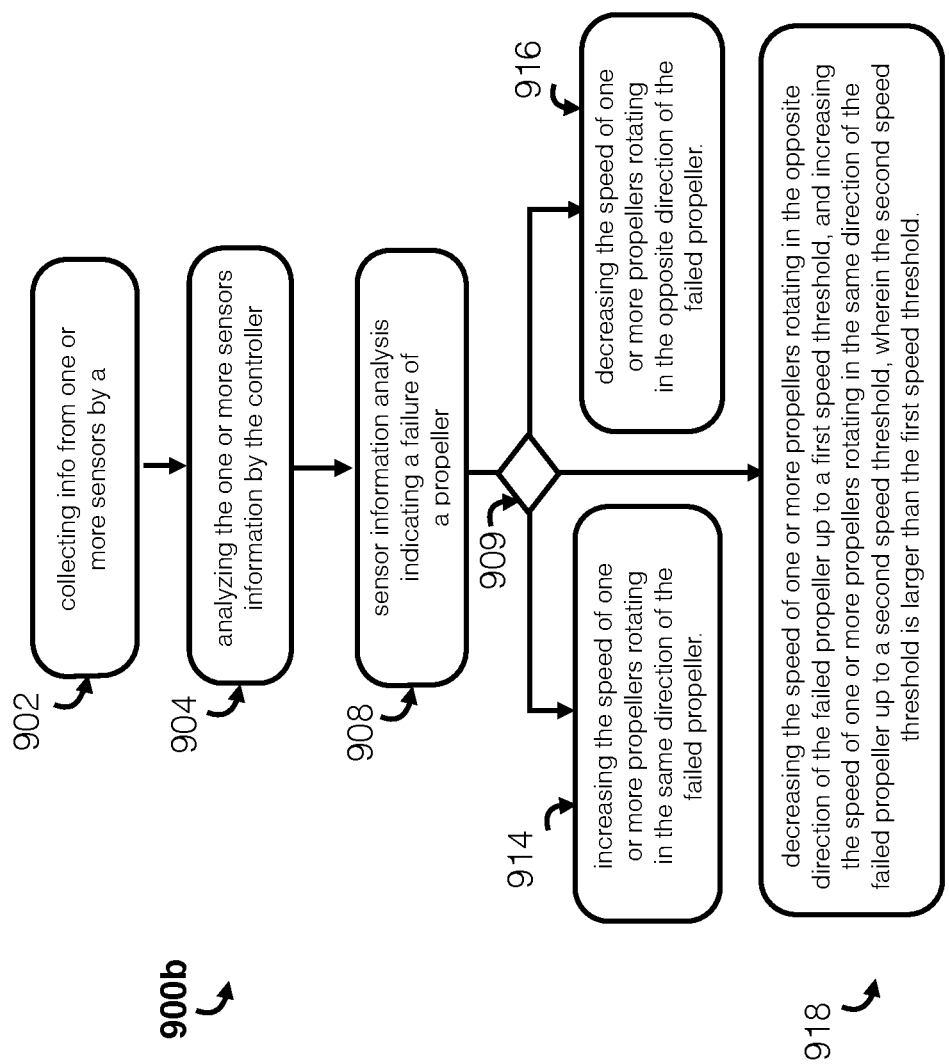
FIG. 9b is a flowchart of another method for controlling propeller speed in a flying system.

FIG. 9*b* shows an example r method 900*b* for controlling propeller speed in a flying system. The method 900*b* may be executed by a controller 704 and may be implemented as instructions stored at a non-transitory machine-readable medium.

At 902, the operations start by collecting data from one or more sensors 706 by a controller 704. At 904, the operations continue by the controller analyzing the data captured by the one or more sensors. The one or more sensors comprise at least one of: an accelerometer; a gyroscope; a speedometer; a Global Positioning System (GPS) receiver; an altimeter; an Inertial Measurement Unit (IMU); or a combinations thereof.

In some embodiments, operations continue at 908, when analysis of the sensor data by a controller 704 indicates a failure of a propeller. The failure of a propeller causes a loss of lift force, and may cause one or more of the following changes to the spatial position of the flying system 200: spinning, a loss of altitude, a change in the orientation. The sensor 706 may comprise a gyroscope, accelerometer, an altimeter, an inertial measurement unit (IMU), or similar device with similar capabilities. In some embodiments, the changes to orientation and/or spinning may be detected by a gyroscope or IMU device of the sensor 706. The changes in altitude may be detected by an altimeter and/or accelerometer of the sensor 706. In some embodiments, the sensor 706 indicates a failure of a propeller by detecting changes exceeding a threshold in the electric current of a failed propeller electric motor. For example, a current drop by 50% or more, or a current drop to zero, may indicate the propeller is not working properly or has stopped operating.

In some embodiments, operations may continue at 914 by adjusting the speed of one or more propellers, wherein adjusting the speed of one or more propellers comprises the controller increasing the speed of one or more propellers rotating in the same direction of the failed propeller. Referring to embodiments of FIG. 6 as an example, when propeller 616 fails, the sensors 706 will detect a change in orientation of the flying system 200. In some embodiments, when the propellers 614, which are rotating in the same direction as the failed propeller 616, are not operating at maximum speed, the controller 704 may configure propeller 614 to rotate faster, so that the combined angular momentum generated by all operating propellers has a sum of zero, and the flying system orientation is restored.

In some embodiments, operations may continue at 916 by adjusting the speed of one or more propellers, wherein adjusting the speed of one or more propellers comprises the controller decreasing the speed of one or more propellers rotating in the opposite direction of the failed propeller. Referring to embodiments of FIG. 6 as an example, when propeller 616 fails, the sensors 706 will detect a change in orientation of the flying system 200. In some embodiments, when the propellers are operating at maximum speed, the controller 704 may configure the propellers 612 and 618, which operate at the opposition direction of the failed propeller 616, to rotate slower such that the combined (total) angular momentum generated by all remaining operational propellers has a sum of zero.

In some embodiments, operations may continue at 918 by adjusting the speed of one or more propellers, wherein adjusting the speed of one or more propellers comprises the controller decreasing the speed of one or more propellers rotating in the opposite direction of the failed propeller up to a first speed threshold, and increasing the speed of one or more propellers rotating in the same direction of the failed propeller up to a second speed threshold, wherein the second speed threshold is larger than the first speed threshold. In some embodiments, the first threshold and the second threshold are selected such that the combined angular momentum generated by all operating propellers has a sum of zero. In some embodiments an arm associated with an operating propeller is moved to bring the center of lift of the flight system to a desired position relative to the center of gravity.

Referring to embodiments of FIG. 6 as an example, when propeller 616 fails, the sensors 706 will detect a change in orientation of the flying system 200. In a preferred embodiment, the objective is to also maintain a total minimum lift force by all propellers combined, such that the loss of lift force by failure of one or more propellers is compensated by other propellers. In such embodiment, the speeds of propellers operating in the direction of the failed propeller are increased, up to a possible maximum speed(i.e. a first threshold), and the speeds of propellers operating in the opposite direction are decreased to a second threshold which is smaller than the first threshold, such that the combined angular momentum generated by all operating propellers has a sum of zero. In another example embodiment, when the propellers are not operating at maximum speed, the controller 704 may configure propeller 614 to rotate at a faster speed (i.e. a first threshold) while configuring the propellers 612 and 618 to rotate at a slower speed, i.e. a second threshold which is smaller than the first threshold, such that the (total) angular momentum generated by all operating propellers has a sum of zero. For example, the propeller 614 may be configured to rotate at 50% faster speed while the propellers 612 and 618 may be each configured to rotate at 25% slower speed.

The choice between 914, 916 and 918 is made at 909 and depends on the analysis of the sensor data and the condition of the propellers (i.e. block 908). In some embodiments, when the propellers are operating at the maximum speed, increasing the speed further would not be possible. In such embodiments, stabilizing the orientation will be achieved through decreasing the speed of one or more propellers in the opposite direction of the failed propeller (i.e. block 916). In some embodiments, in case the propellers are not operating at the maximum speed, the speed of one or more propellers, rotating in the same direction of the failed propeller, may be increased (i.e. block 914), so that the combined angular momentum generated by all operating propellers has a sum of zero, and the flying system orientation is restored. This operation may be executed, when the speed of the one or more propellers can be increased such that the increased speed of the one or more propellers compensates for the failed propeller. In some embodiments, when the conditions for block 914 and/or block 916 are not satisfied, the controller executes operations of block 918. In this case the propellers are not operating at the maximum speed, however also the speed of one or more propellers, rotating in the same direction of the failed propeller, may not be increased large enough such that by just increasing their speeds, the combined angular momentum generated by all operating propellers would have a sum of zero.

Figure 9C:
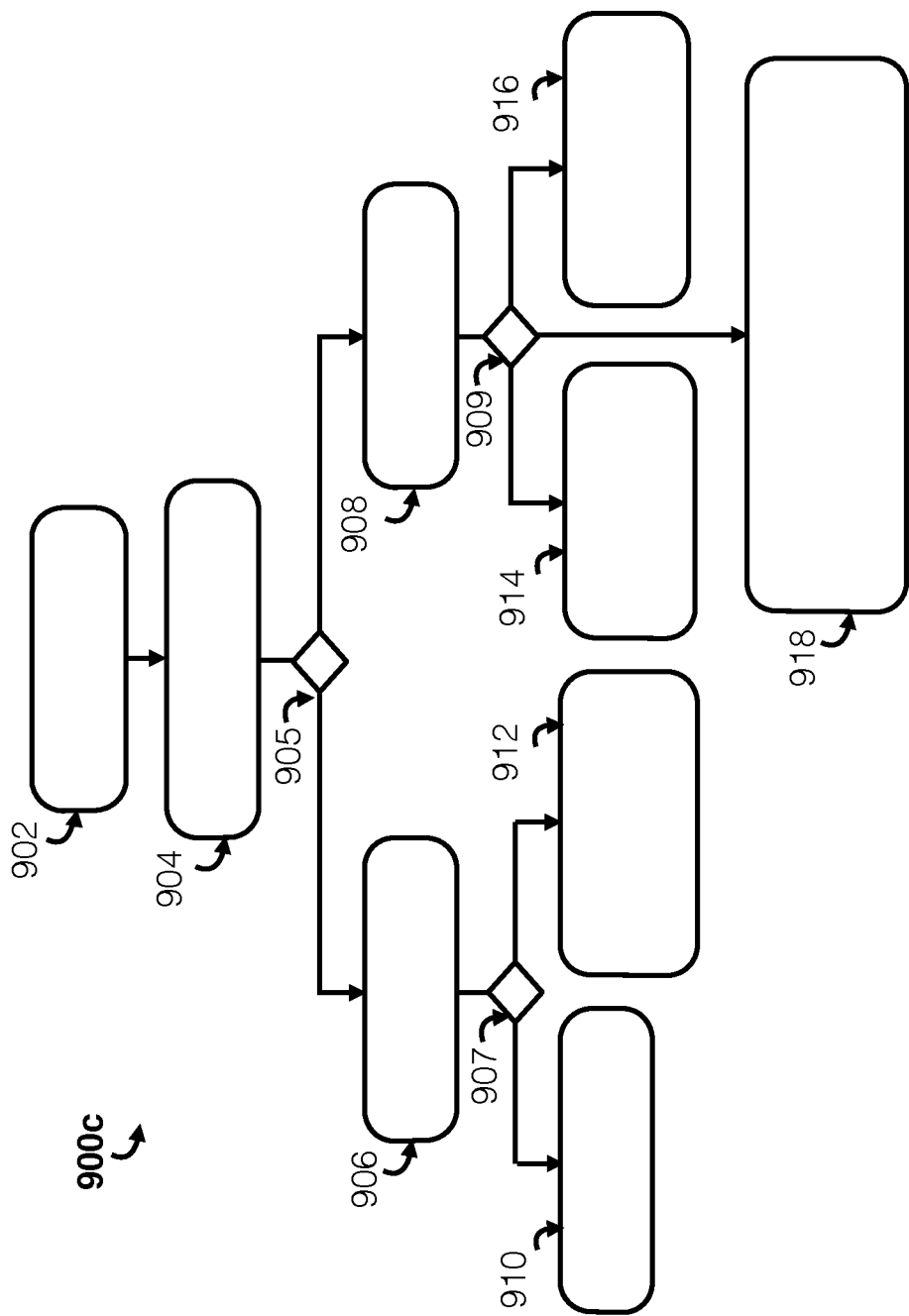
FIG. 9c is a flowchart of another method for controlling propeller speed in a flying system that combines features of the methods shown in FIGS. 9a and 9b.

FIG. 9c shows an example method 900c for controlling propeller speed in a flying system. The method 900c may be executed by a controller 704 and may be implemented as instructions stored at a non-transitory machine-readable medium. The method 900c combines features of the methods shown in FIGS. 9a and 9b. The choice between 906 and 908 is made at 905 and depends on the analysis of the sensor data and the condition of the propellers (i.e. block 904). In some embodiments, the operations move to block 906, when the conditions of block 906 are satisfied (i.e. a change in flight orientation is detected). In some embodiments, the operations move to block 908, when the conditions of block 908 are satisfied (i.e. a failure of a propeller is detected). In some embodiments the methods 900a and 900b may be executed simultaneously if computing resources permit. In some embodiments the methods 900a and 900b may be executed consecutively.

In some embodiments, the sensor comprises at least one or more of an accelerometer, a gyroscope, a speedometer, an IMU, a Global Positioning System (GPS) receiver, and/or an altimeter or combinations thereof. In some embodiments, the controller is coupled to the propellers via one or more electric connections, and the controller sends signals via the one or more electric connections to control the speed of the propellers. In some embodiments increasing the speed of a propeller comprises increasing a voltage input to an electric motor rotating the propeller, and decreasing the speed of a propeller comprise decreasing a voltage input to an electric motor rotating the propeller.

The sizes shown in the diagrams are provided as an example, and actual sizes and relative sizes of different objects, parts and pieces may be different in actual implementations.

Some embodiments, such as the controller 704 may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, a Random-Access Memory (RAM), a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

When so arranged as described herein, each computing device described in the present disclosure may be transformed from a generic and unspecific computing device to a combination device comprising hardware and software configured for a specific and particular purpose.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, the claims provided herein, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the invention is not limited to the embodiments so described, but can be practiced with modification and alteration without departing from the scope of the appended claims. For example the above embodiments may include specific combinations of features as further provided below.

In one example, a non-transitory machine-readable medium is provided comprising instructions that, when executed by a controller of a flight system, cause the controller to: capture data from one or more sensors; perform an analysis on the data; wherein the analysis is configured to indicate a failure of a propeller; adjust the speed of one or more propellers coupled to the controller based on the analysis indicating the failure of the propeller; wherein the speed of the one or more propellers is adjusted by increasing the speed of a propeller rotating in the opposite direction of the failed propeller up to a first speed threshold, and increasing the speed of another propeller rotating in the same direction of the failed propeller up to a second speed threshold, wherein the second speed threshold is larger than the first speed threshold.

In some embodiments, the first threshold and the second threshold are selected such that the combined angular momentum generated by all operating propellers has a sum of zero. In some embodiments, the controller is coupled to the propellers via one or more electric connections, and wherein the controller sends signals via the one or more electric connections to control the speed of the propellers. In some embodiments, increasing the speed of the propeller rotating in the opposite direction of the failed propeller comprises increasing a voltage input to an electric motor rotating the propeller, and wherein the increasing the speed of the other propeller rotating in the same direction of the failed propeller comprises increasing a voltage input to an electric motor rotating the other propeller.

In some embodiments, the analysis indicates a failure of a propeller by: detecting a change in a spatial position of the flight system including one or more of: spinning, a loss of altitude, and a change in orientation; detecting a change exceeding a threshold in an electric current of the failed propeller electric motor; or a combination thereof. In some embodiments, an arm associated with an operating propeller is moved to bring the center of lift of the flight system to a desired position relative to the center of gravity of the flight system.

In another example, a non-transitory machine-readable medium is provided comprising instructions that, when executed by a controller of a flight system, cause the controller to: capture data from one or more sensors; perform an analysis on the data, wherein the analysis is configured to indicate a failure of a propeller; adjust the speed of one or more propellers coupled to the controller based on the analysis indicating the failure of the propeller; wherein the speed of the one or more propellers is adjusted by increasing the speed of propellers rotating in the same direction of the failed propeller until the data captured by one or more sensors indicates that a flight orientation of the flight system has returned to an original flight orientation existent prior to the failure of the propeller.

In some embodiments, the speed of the one or more propellers is adjusted by increasing the speed of the one or more propellers such that the combined angular momentum generated by all operating propellers has a sum of zero. In some embodiments, the analysis is configured to indicate a change in flight orientation of the flight system from the original flight orientation; and wherein the speed of the one or more propellers is adjusted by increasing the speed of a propeller and decreasing the speed of another propeller, until the data captured by the one or more sensors indicates that the flight orientation has returned to the original flight orientation.

In some embodiments, the analysis is configured to indicate a change in flight orientation of a flight system from the original flight orientation; and wherein the speed of the one or more propellers is adjusted by increasing the speed of a propeller and decreasing the speed of another propeller, such that the combined angular momentum generated by all operating propellers has a sum of zero. In some embodiments, the speed of the one or more propellers is adjusted by decreasing the speed of a propeller rotating in the opposite direction of the failed propeller. In some embodiments, the controller is coupled to the one or more propellers via one or more electric connections, and wherein the controller sends signals via the one or more electric connections to control the speed of the one or more propellers.

In some embodiments, increasing the speed of the propeller comprises increasing a voltage input to an electric motor rotating the propeller, and decreasing the speed of the other propeller comprises decreasing the voltage input to the electric motor rotating the other propeller. In some embodiments, the analysis indicates the failure of the propeller by: detecting a change in a spatial position of the flight system including one or more of: spinning, a loss of altitude, and a change in the orientation; detecting a change exceeding a threshold in an electric current of the failed propeller electric motor; or a combination thereof. In some embodiments, an arm associated with an operating propeller is moved to bring the center of lift of the flight system to a desired position relative to the center of gravity of the flight system.

In another example, a flight system comprises: a controller, a first group of one or more propellers coupled to the controller operating in a first direction, a second group of one or more propellers coupled to the controller operating in a second direction, wherein the second direction is the opposite of the first direction; wherein the controller comprises of one or more sensors; and wherein the controller is configured to: capture data from the one or more sensors; perform an analysis on the data; wherein the analysis is configured to indicate a failure of a propeller; adjust the speed of one or more propellers coupled to the controller based on the analysis indicating the failure of the propeller; wherein the speed of the one or more propellers is adjusted by increasing the speed of a propeller rotating in the opposite direction of the failed propeller up to a first speed threshold, and increasing the speed of another propeller rotating in the same direction of the failed propeller up to a second speed threshold, wherein the second speed threshold is larger than the first speed threshold. In some embodiments, the first threshold and the second threshold are selected such that the combined angular momentum generated by all operating propellers has a sum of zero.

However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

The invention claimed is:

1. A non-transitory machine-readable medium comprising instructions that, when executed by a controller of a flight system, cause the controller to:
   capture data from one or more sensors;
   perform an analysis on the data; wherein the analysis is configured to indicate a failure of a propeller;
   adjust the speed of one or more propellers coupled to the controller based on the analysis indicating the failure of the propeller;
   wherein the speed of the one or more propellers is adjusted by increasing the speed of a propeller rotating in the opposite direction of the failed propeller up to a first speed threshold, and increasing the speed of another propeller rotating in the same direction of the failed propeller up to a second speed threshold, wherein the second speed threshold is larger than the first speed threshold.

2. The non-transitory machine-readable medium of claim 1, wherein the first threshold and the second threshold are selected such that the combined angular momentum generated by all operating propellers has a sum of zero.

3. The non-transitory machine-readable medium of claim 1, wherein the controller is coupled to the propellers via one or more electric connections, and wherein the controller sends signals via the one or more electric connections to control the speed of the propellers.

4. The non-transitory machine-readable medium of claim 1, wherein increasing the speed of the propeller rotating in the opposite direction of the failed propeller comprises increasing a voltage input to an electric motor rotating the propeller, and wherein the increasing the speed of the other propeller rotating in the same direction of the failed propeller comprises increasing a voltage input to an electric motor rotating the other propeller.

5. The non-transitory machine-readable medium of claim 1, wherein the analysis indicates a failure of a propeller by:
   detecting a change in a spatial position of the flight system including one or more of: spinning, a loss of altitude, and a change in orientation;
   detecting a change exceeding a threshold in an electric current of the failed propeller electric motor; or
   a combination thereof.

6. The non-transitory machine-readable medium of claim 1, wherein an arm associated with an operating propeller is moved to bring the center of lift of the flight system to a desired position relative to the center of gravity of the flight system.

7. A non-transitory machine-readable medium comprising instructions that, when executed by a controller of a flight system, cause the controller to:
   capture data from one or more sensors;
   perform an analysis on the data, wherein the analysis is configured to indicate a failure of a propeller;
   adjust the speed of one or more propellers coupled to the controller based on the analysis indicating the failure of the propeller;
   wherein the speed of the one or more propellers is adjusted by increasing the speed of propellers rotating in the same direction of the failed propeller until the data captured by one or more sensors indicates that a flight orientation of the flight system has returned to an original flight orientation existent prior to the failure of the propeller.

8. The non-transitory machine-readable medium of claim 7, wherein the speed of the one or more propellers is adjusted by increasing the speed of the one or more propellers such that the combined angular momentum generated by all operating propellers has a sum of zero.

9. The non-transitory machine-readable medium of claim 7, wherein the analysis is configured to indicate a change in flight orientation of the flight system from the original flight orientation; and wherein the speed of the one or more propellers is adjusted by increasing the speed of a propeller and decreasing the speed of another propeller, until the data captured by the one or more sensors indicates that the flight orientation has returned to the original flight orientation.

10. The non-transitory machine-readable medium of claim 7, wherein the analysis is configured to indicate a change in flight orientation of a flight system from the original flight orientation; and wherein the speed of the one or more propellers is adjusted by increasing the speed of a propeller and decreasing the speed of another propeller, such that the combined angular momentum generated by all operating propellers has a sum of zero.

11. The non-transitory machine-readable medium of claim 7, wherein the speed of the one or more propellers is adjusted by decreasing the speed of a propeller rotating in the opposite direction of the failed propeller.

12. The non-transitory machine-readable medium of claim 7, wherein the controller is coupled to the one or more propellers via one or more electric connections, and wherein the controller sends signals via the one or more electric connections to control the speed of the one or more propellers.

13. The non-transitory machine-readable medium of claim 9, wherein increasing the speed of the propeller comprises increasing a voltage input to an electric motor rotating the propeller, and decreasing the speed of the other propeller comprises decreasing the voltage input to the electric motor rotating the other propeller.

14. The non-transitory machine-readable medium of claim 7, wherein the analysis indicates the failure of the propeller by:

detecting a change in a spatial position of the flight system including one or more of: spinning, a loss of altitude, and a change in the orientation;
detecting a change exceeding a threshold in an electric current of the failed propeller electric motor; or
a combination thereof.

15. The non-transitory machine-readable medium of claim 7, wherein an arm associated with an operating propeller is moved to bring the center of lift of the flight system to a desired position relative to the center of gravity of the flight system.

16. A flight system comprising:
a controller,
a first group of one or more propellers coupled to the controller operating in a first direction,
a second group of one or more propellers coupled to the controller operating in a second direction, wherein the second direction is the opposite of the first direction;
wherein the controller comprises of one or more sensors; and wherein the controller is configured to:
capture data from one or more sensors;
perform an analysis on the data;
wherein the analysis is configured to indicate a failure of a propeller;
adjust the speed of one or more propellers coupled to the controller based on the analysis indicating the failure of the propeller;
wherein the speed of the one or more propellers is adjusted by increasing the speed of a propeller rotating in the opposite direction of the failed propeller up to a first speed threshold, and increasing the speed of another propeller rotating in the same direction of the failed propeller up to a second speed threshold, wherein the second speed threshold is larger than the first speed threshold.

17. The non-transitory machine-readable medium of claim 16, wherein the first threshold and the second threshold are selected such that the combined angular momentum generated by all operating propellers has a sum of zero.

\* \* \* \* \*